United States Patent [19]

Bolton et al.

[11] Patent Number: 5,152,252
[45] Date of Patent: Oct. 6, 1992

[54] WATER TREATMENT CONTROL SYSTEM FOR A BOILER

[75] Inventors: Michael P. Bolton, Fox Point; James A. Rodrian, Grafton; Donald R. Janke, Milwaukee, all of Wis.

[73] Assignee: Autotrol Corporation, Milwaukee, Wis.

[21] Appl. No.: 824,634

[22] Filed: Jan. 23, 1992

[51] Int. Cl.⁵ .............................................. F22B 5/02
[52] U.S. Cl. ................................. 122/401; 122/451 R; 137/5; 210/139; 210/177
[58] Field of Search ............... 122/451 R, 401; 210/96.1, 138, 139, 177; 137/5

[56] References Cited

U.S. PATENT DOCUMENTS

| | | | |
|---|---|---|---|
| 4,460,008 | 7/1984 | D'Leary et al. | 137/5 X |
| 4,659,459 | 4/1987 | D'Leary et al. | 210/96.1 |
| 4,903,642 | 2/1990 | Tamaru et al. | 122/401 |
| 4,990,245 | 2/1991 | Wieme | 210/138 |

OTHER PUBLICATIONS

Brochure for the Model 250 Boiler TDS control by Lakewood Instruments. No Date.
Brochure regarding the Model 65 clock timer from Lakewood Instruments. No Date.
Brochure describing the System K electronic pulse timer from Morr Controls. Nov. 1986.

*Primary Examiner*—Edward G. Favors
*Attorney, Agent, or Firm*—Quarles & Brady

[57] ABSTRACT

An apparatus controls treatment of water flowing through a boiler and includes a device that monitors the conductivity of the water. A controller opens a drain valve at periodic intervals, and closes the drain valve when the conductivity drops below a defined threshold. A mechanism measures the volume of water that flows into the boiler and a chemical is added to the water when a specified amount of water has flowed into the boiler. Alternatively the application of the chemical can occur at regular intervals of time. The chemical is applied for a user definable period of time. The application of the chemical is suspended when the cessation of water flow into the boiler is detected.

15 Claims, 7 Drawing Sheets

FIG. 2 SYSTEM CONTROLLER 40

FIG. 4

MAIN CONTROL PROGRAM

FIG. 5A

ONE-SECOND SUBROUTINE

WATER TREATMENT CONTROL SYSTEM FOR A BOILER

BACKGROUND OF THE INVENTION

The present invention relates to boilers; and particularly to apparatus for chemically treating of water used in boilers.

Large boilers, such as those used in commercial buildings, super heat water which then flows under pressure to an appliance where the pressure is reduced to convert the water to steam. The appliance may be a radiator for heating the building, an autoclave for sterilizing hospital instruments, or laundry equipment. In many cases, the steam condenses to liquid form in the appliance and the condensate is returned to a feed tank which supplies water to the boiler. The water cycles through the system in this manner.

In some appliances the steam is vented to the atmosphere and little water returns from the appliance to the feed water tank. To make up for the water lost from the system in this manner, water from a well or municipal water supply is added as needed to the feed water tank. Typically a float valve in the tank opens to add the water when the level in the tank drops below a given point.

When the steam is created minerals present in the super heated water remain in the condensate. As the steam leaves the system and is replaced by water from a supply, the concentration of minerals and other dissolved solids in the system increases. Periodically, an outlet valve on the boiler is opened to drain a portion of the water with a high concentration of dissolved solids. This fluid loss also is replenished by fresh water from the supply causing the concentration of dissolved solids in the boiler water to diminish. The draining process is commonly called a "blow down". Conventional systems for automatically controlling the blow down measure the electrical conductivity of the water and open the drain valve when the conductivity exceeds a threshold level which corresponds to an undesirably high concentration of total dissolved solids.

The internal components of the boiler may corrode over time depending upon the acidity of the water from the supply. To counter this effect, a corrosion inhibitor is added to the boiler water and must be replenished in order to maintain the proper concentration as water escapes.

It is therefore desirable to provide an automatic control system for blowing down the boiler when the concentration of total dissolved solids becomes excessive. The control system also should add chemicals as needed. However, in order to reduce operating expenses, the addition of chemicals must be regulated so that only the amounts necessary for satisfactory operation are added to the boiler. It is also desirable that the accuracy of the system be periodically checked and an indication given to the operator when maintenance is required, such as cleaning the conductivity sensor.

SUMMARY OF THE INVENTION

An apparatus, such as a boiler, includes a water inlet and a valve through which water is drained from the apparatus. The water is controlled by a system that comprises a sensor of the electrical conductivity of water flowing from the boiler through the drain valve. A valve control periodically opens the drain valve and closes the valve when the electrical conductivity is less than a defined threshold level. The amount of water flowing through the inlet is measured and a indication provided when the flow ceases.

The apparatus adds a chemical to water flowing through the inlet for a preset length of time whenever a given event occurs. This event may be when a defined amount of water has flowed through the inlet since a previous application of the chemical or at regularly occurring intervals. A timer measures the amount of time that the chemical is being added to the water and the application terminates when the timer indicates that the chemical has been applied for the preset length of time.

Chemical application is halted when the water ceases flowing through the inlet. In this case, operation of the timer also is suspended and the time measurement of the timer is retained so that the timer operation can resume at the same measurement when water flows again through the inlet.

DETAILED DESCRIPTION OF THE INVENTION

Figure 1:
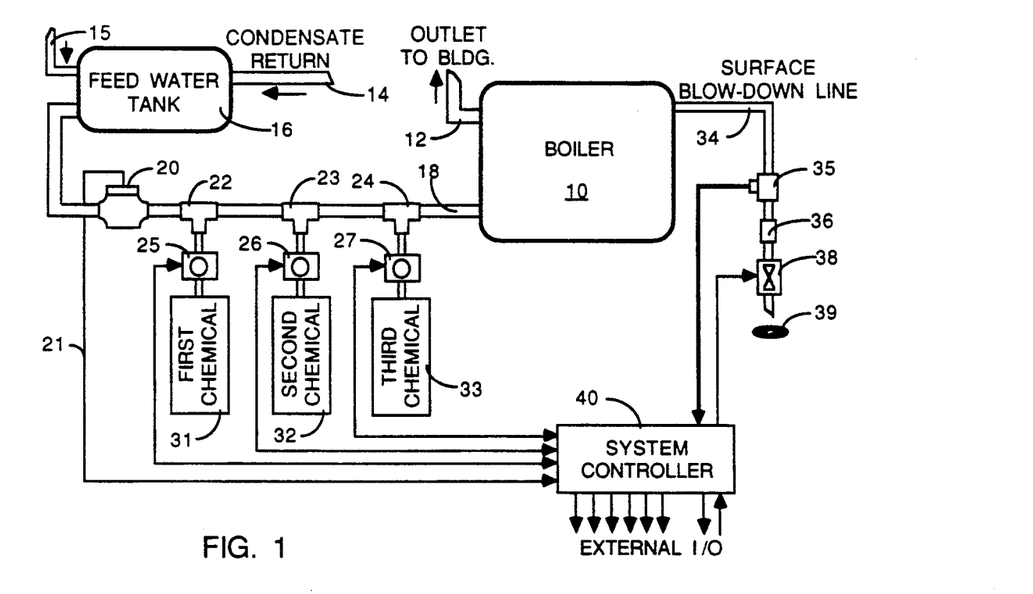
FIG. 1 is a diagram of a water circulation system for a boiler.

With initial reference to FIG. 1, a boiler 10 has a outlet 12 through which super heated water flows to appliances in a building. The condensate from those appliances returns through pipe 14 to a feed water tank 16. A water inlet 18 of the boiler 10 is connected to the feed water tank 16 through a conventional flow meter 20. The flow meter 20 emits a pulsed signal on line 21 at a frequency that corresponds to the rate at which water is flowing from the feed water tank 16 into the boiler. The feed water tank 16 has an inlet 15 that is connected to a water supply by a conventional float valve within the tank that opens whenever the water drops below a given level.

Three T-fittings 22, 23 and 24, or corporation stops, are mounted in the water line between the flow meter 20 and the boiler water inlet 18. These fittings 22, 23 and 24 connect the outputs of three pumps 25, 26 and 27, respectively, to the boiler 10. Each of these electrically operated pumps 25, 26 and 27 is individually controllable to introduce liquid chemicals from three tanks 31, 32 and 33, respectively, into the water flowing to the boiler inlet 18.

Another outlet 34 of the boiler 10 is connected to a conductivity sensor 35 which measures the electrical conductivity of the water flowing through that outlet and produces an analog electrical signal representative of the conductivity. As is well known, the conductivity of fluids is highly temperature dependent. As a result, the conductivity sensor 35 includes an integral temperature measuring device, such as a thermistor, that provides an analog signal indicative of the sensor's temperature. The water flows through the conductivity sensor 35 and a flow restrictor 36 that maintains the water in the sensor under pressure and in a liquid state. The outlet of the flow restrictor 36 is connected to an electrically operated valve 38 which when open allows water to escape the boiler and flow into a waste drain 39, although most of the water is converted to steam when its pressure is reduced at the valve outlet. The valve 38 is opened to blow down the boiler 10.

The flow meter 20, conductivity sensor 35, chemical pumps 25-27, and drain valve 38 are connected to a system controller 40. As will be described in detail, the system controller 40 employs the electrical conductivity measurement provided by sensor 35 to determine when to open valve 38 to blow down the system. Further, the system controller 40 calculates the volume of water flowing into the boiler 10 based on the signal from meter 20 and determines when and how much of each of the chemicals in tanks 31, 32 and 33 to add to the boiler water.

System Controller

Figure 2:
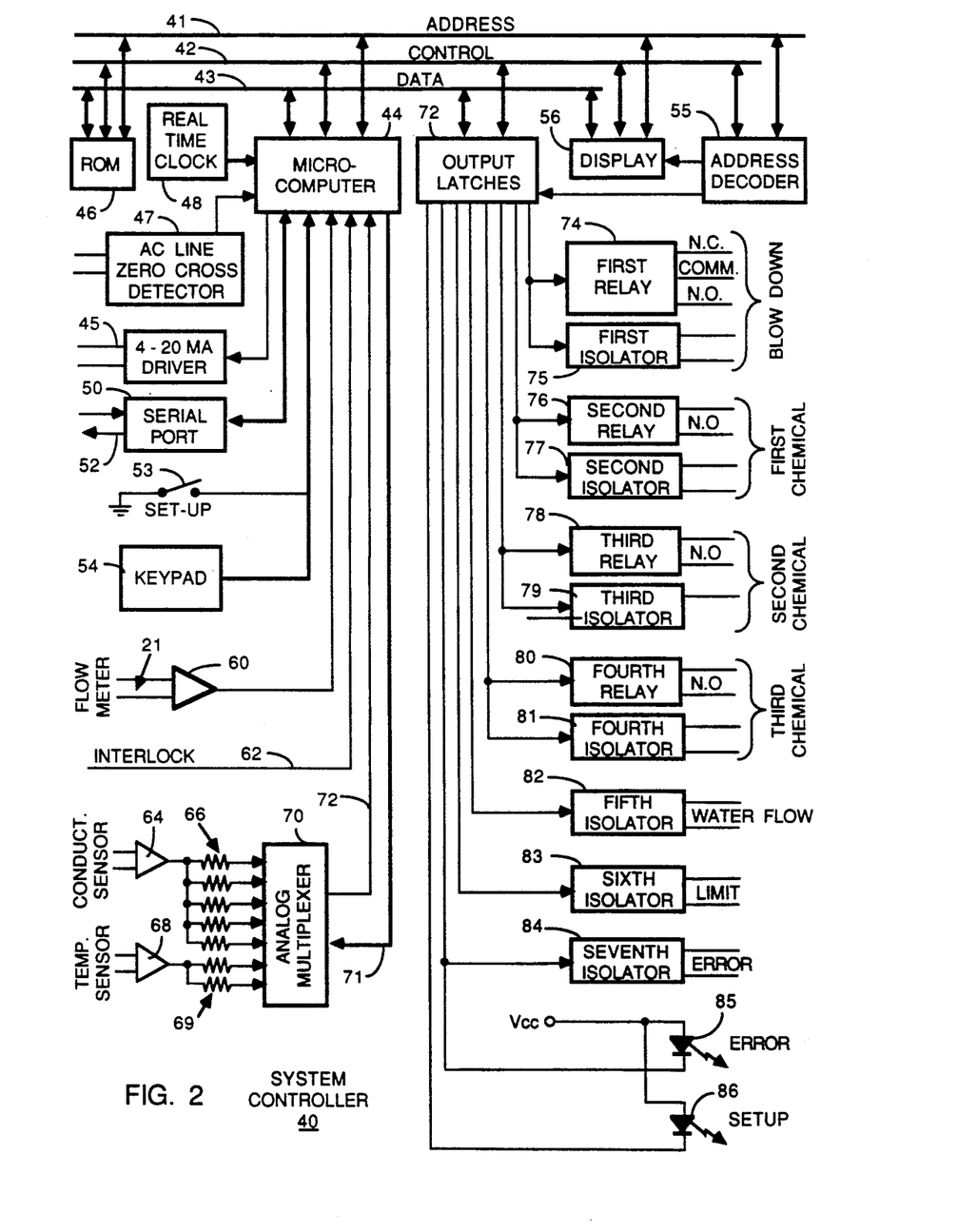
FIG. 2 is a schematic diagram of the circuitry for the system controller shown in FIG. 1.

With reference to FIG. 2, the system controller 40 is based around a microcomputer 44 connected to a set of parallel address and data buses 41 and 42. A set of control lines from the microcomputer form a bus 43. The microcomputer 44 may be a model MC68HCP11A1FN manufactured by Motorola, Inc. This type of microcomputer includes several digital input/output ports, an analog input port, counters and an internal random access memory. The control program which is executed by microcomputer 44 is stored in a read only memory 46.

At power up, the microcomputer 44 receives time and date information from a battery powered real-time clock 48 which information is stored in locations of the microcomputer's internal memory. Thereafter, the stored time and date information is periodically updated based on the frequency of the alternating current that supplies electrical power to the controller. For this purpose a zero crossing detector 47 interrupts the microcomputer 44 every time the voltage between the electrical supply lines 45 makes a zero crossing. This causes the microcomputer to increment a count of the zero crossings. Whenever 120 zero crossings are counted from a sixty Hz. power source, the time in the microcomputer memory is incremented by one second and the zero crossing counter is reset.

One output of the microcomputer 44 is connected to a 4-20 milliampere current driver 50 which produces an analog current loop signal indicative of the boiler water conductivity. The microcomputer also is connected to a serial port circuit 52 to provide bidirectional digital communication to an external device, such as a host computer. A keypad 54 allows an operator to enter commands into the microcomputer 44 and a display 56, which is connected to the buses 41-43, enables the microcomputer to present alphanumeric and other information to the operator.

The different water sensor signals are fed to the microcomputer 44. Specifically, line 21 from the flow meter 20 connects to a buffer amplifier 60 which sends the pulsed signal to a digital input of the microcomputer 44. This input is connected to an internal counter of the microcomputer which counts the pulses of the flow meter signal. An interlock input 62 of the microcomputer can be connected to a safety shut off switch which shuts down the controller in the event of an emergency. The analog signal from the conductivity sensor 35 is connected to a current to voltage amplifier 64. The output of the amplifier 64 is coupled through a set of resistors 66, each having a different value, to separate inputs, of an analog multiplexer 70. The signal from the temperature sensor in device 35 is connected to another amplifier 68 in the controller 40, the output of which is coupled by a pair of different value resistors 69 to additional inputs of the analog multiplexer 70. The microcomputer 44 sends control signals over lines 71 that cause the multiplexer 70 to select one of the inputs to connect to an analog input line 72. The analog input line 72 is connected to an internal analog to digital converter within the microcomputer.

The microcomputer 44 generates signals for operating the chemical pumps 25-27 and other devices via a group of output latches 72. Data bits sent over the data bus 43 are stored in the latches 72 upon the receipt of an enable signal from an address decoder 55. The address decoder 55 responds to specific addresses on bus 41 and control signals on bus 43 from the microcomputer by producing control signals which enable the output buffers 72 and display 56.

There are eight latches in group 72, each producing a different output control signal. One latch is connected to the coil of a first relay 74 that has normally closed (N.C.) and normally open (N.O.) contacts. This latch also is connected to a first opto-isolator 75 which closes a conductive path between two output lines when the latch is set with a high logic level data bit. The first relay 74 and the first opto-isolator 75 are activated during a blow down and the contacts of the first relay 74 apply power to drain valve 38.

Another one of the output latches 72 is connected to the coil of a second relay 76 which has normally open contacts. The contacts of the second relay are connected to apply electricity to the first pump 25 which introduces the chemical from tank 31 into the boiler water. An indication of when this chemical is being added is provided by an output signal from a second opto-isolator 77. Another pair of output latches 72 are connected to the third and fourth relays 78 and 80 to close their normally open contacts which respectively apply power to chemical pumps 26 and 27. Third and fourth opto-isolators 79 and 81 provide digital signals indicating when chemicals from these pumps 26 and 27 are being added to the boiler water.

Yet another one of the output latches 72 is connected to a fifth opto-isolator 82 to produce an output signal that indicates the amount of water flowing from the feed water tank 16 into the boiler 10 via inlet 18. This output signal is pulsed every time an incremental volume of water flows into the boiler. Another latch in group 72 is connected to the sixth opto-isolator 84 to produce a signal when the electrical conductivity of the boiler water is greater than a defined threshold. A seventh opto-isolator 84 and a light emitting diode 85 are connected to the output of a further latch of group 72 to provide indications of when an error condition exists. Another light emitting diode 86 is connected to the final output latch in group 72 and provides a visual indication when the system controller 40 is in the set-up mode, as will be described.

System Operation

When the system controller 40 is first installed on the boiler 10, the user must set-up the system by configuring the different functions which the controller performs. For example, the user must specify when and the period of time that each chemical in tanks 35-37 is to be introduced into the boiler water. The user also sets the electrical conductivity threshold at which a blow down occurs.

The set-up procedure is similar to those used to configure other types of programmable devices. The user momentarily closes switch 53 which signals the microcomputer 44 that the controller is to be placed in the set-up mode. In this mode, the user presses keys on keypad 54 to step through the configuration process. At each step during the set-up, the display 56 presents an inquiry asking the user to select among several options or to specify a value for a given parameter. The user is allowed to step backwards and forwards through the procedure by appropriate activation of arrow keys on keypad 54. At the completion of the set-up process the user momentarily closes switch 53 again to signal that the configuration is complete.

Figure 3:
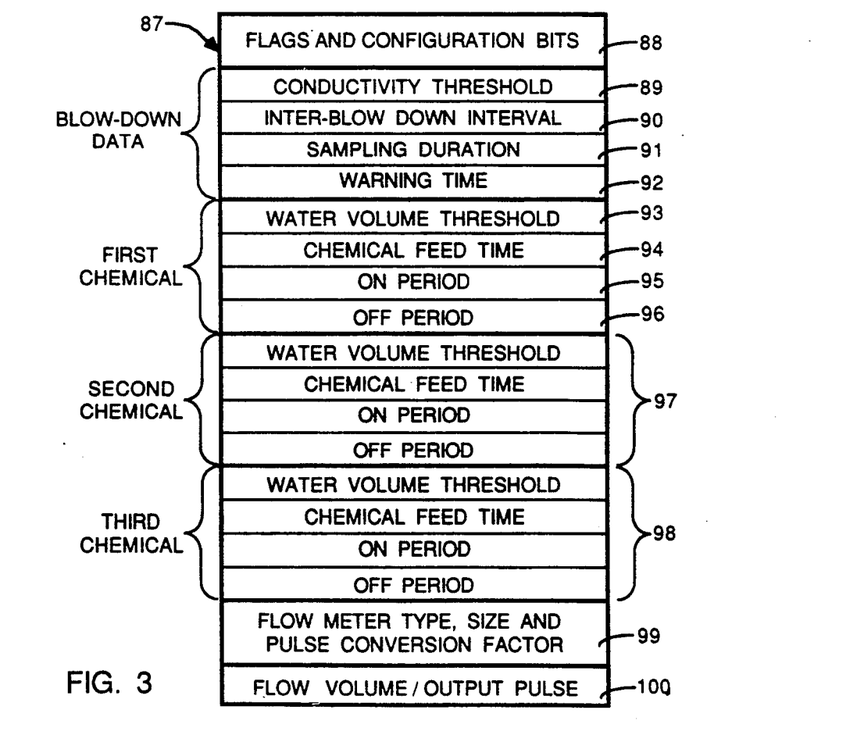
FIG. 3 depicts data structure of information stored in the system controller to define its operation.

The configuration data entered during the set-up mode is stored in a table 87 within the internal non-volatile memory (e.g. an EEPROM) in the microcomputer 44 as depicted in FIG. 3. The data table 87 consists of a number of entries, such as entry 88 which contains flags and configuration bits that indicate control process options that are enabled. The electrical conductivity at which a blow down is to occur is stored as a threshold value in data table entry 89 and another entry 90 denotes the length of time between blow downs. The electrical conductivity is sampled during a blow down and data table entry 91 defines a delay interval between the start of a blow down until the conductivity is sampled. The next entry 92 of the data table is a length of time which if exceeded by the duration of the blow down causes a warning to be issued by the controller, as will be described.

The chemicals in tanks 31-33 can be applied whenever a given volume of water has flowed into the boiler since the last application of that chemical or at regularly occurring intervals. The next entry 93 in the data table 87 holds a numerical designation of the incremental water volume which triggers another application of the first chemical and data table entry 94 is a numerical value designating the interval of time that the first chemical pump 25 will be turned on. The interval is specified by the user based on the flow rate of the pump 25, so that the proper amount of the first chemical is applied to the water. When water flow volume is not to be used in determining when to apply the first chemical, data table entry 95 designates the period that the pump 25 is turned on and entry 96 defines the interval that the pump is off between applications of the chemical.

The next two sections 97 and 98 of the table 87 of configuration data contain information for the application of chemicals from the second and third tanks 31 and 33. These sections hold the same types of data as just described with respect to application of the first chemical.

Section 99 of the configuration data table 87 contains information defining the type of water flow meter 20 which is used in the system. This information defines the size of the inlet 18 and a conversion factor which specifies how the frequency of the signal on output line 21 corresponds to flow rate. This data allows the controller 40 to determine how much water has entered the cooling tower through inlet 18 by counting the number of pulses produced by the flow meter 20 during a fixed period of time, as will be described.

Another data table section 100 contains information that defines the amount of water that is to flow into the boiler before the fifth opto-isolator 82 is pulsed. Thus each pulse of the flow signal from this opto-isolator 82 indicates that the specified amount of water has been added passed, into the boiler from the feed water tank.

The configuration data in table 87 is read by the microcomputer 44 during the execution of a control program stored in ROM 46. The main loop of this program is depicted by the flowchart in FIG. 4 and begins at step 100 where the microcomputer initializes the values of variables, counters and registers that are utilized during program execution.

Figure 4:
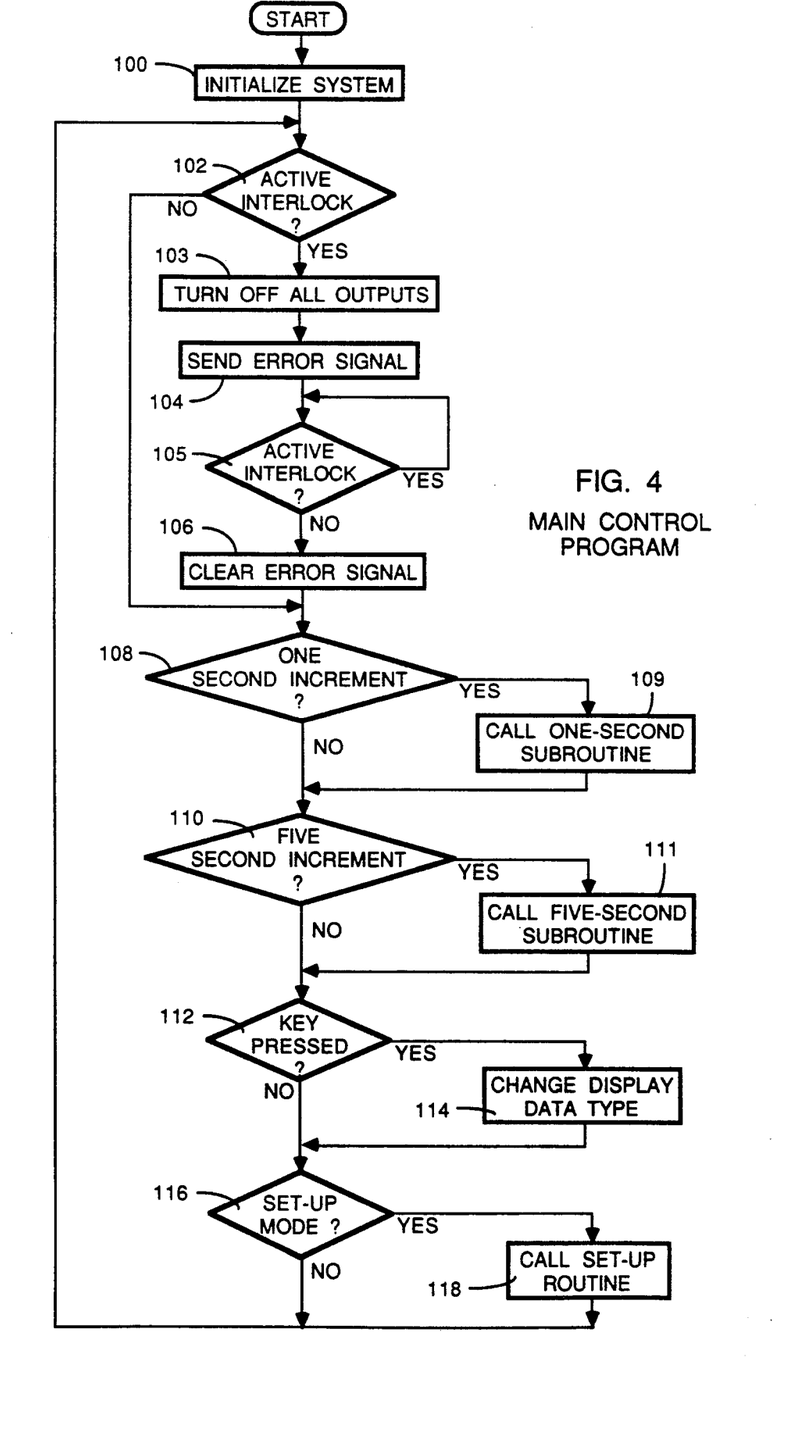
FIG. 4 is a flowchart of the program executed by the boiler controller.

Then at step 102, the interlock input line 62 is read by the microcomputer. This line is intended to be coupled to safety devices, as the operation of the controller 40 halts when the line is active. When the interlock input line 62 is inactive, the program execution jumps to step 108. If an active signal is applied to line 62, all the outputs of the controller 40 are deactivated at step 103 by setting the outputs of most of the output latches 72 to low logic levels. This ceases any blow down which may be occurring by closing drain valve 38 and terminates the application of the chemicals by shutting off pumps 25-27. A high logic level is sent to the output latch for the seventh opto-isolator 84 to produce an error indication at step 104. The setting of this latch also illuminates the error LED 85.

Then at step 105, the program execution loops, continuously testing the interlock input line 62 to determine when the fault condition has been rectified. During this looping, it may be desirable to have the microcomputer 44 test whether the set-up mode switch has been activated or whether other events have occurred so that appropriate information can be displayed to the user. When the interlock signal goes inactive, the program execution resumes at step 106, by discontinuing the error indications from the seventh opto-isolator 84 and the LED 85.

Figure 5A:
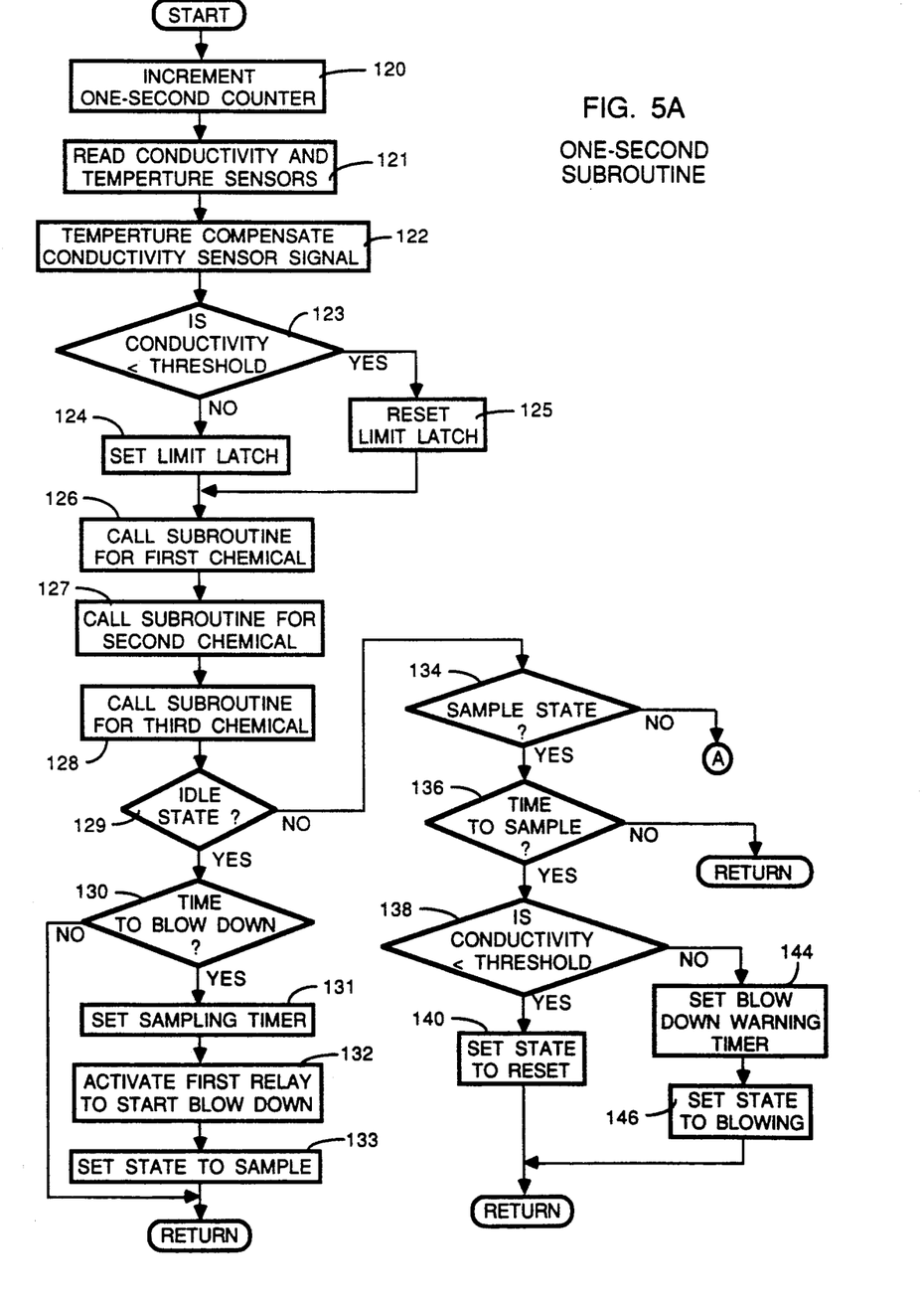
FIGS. 5A–5B are a flowchart of a subroutine that is called by the program in FIG. 4 at one second intervals
Figure 5B:
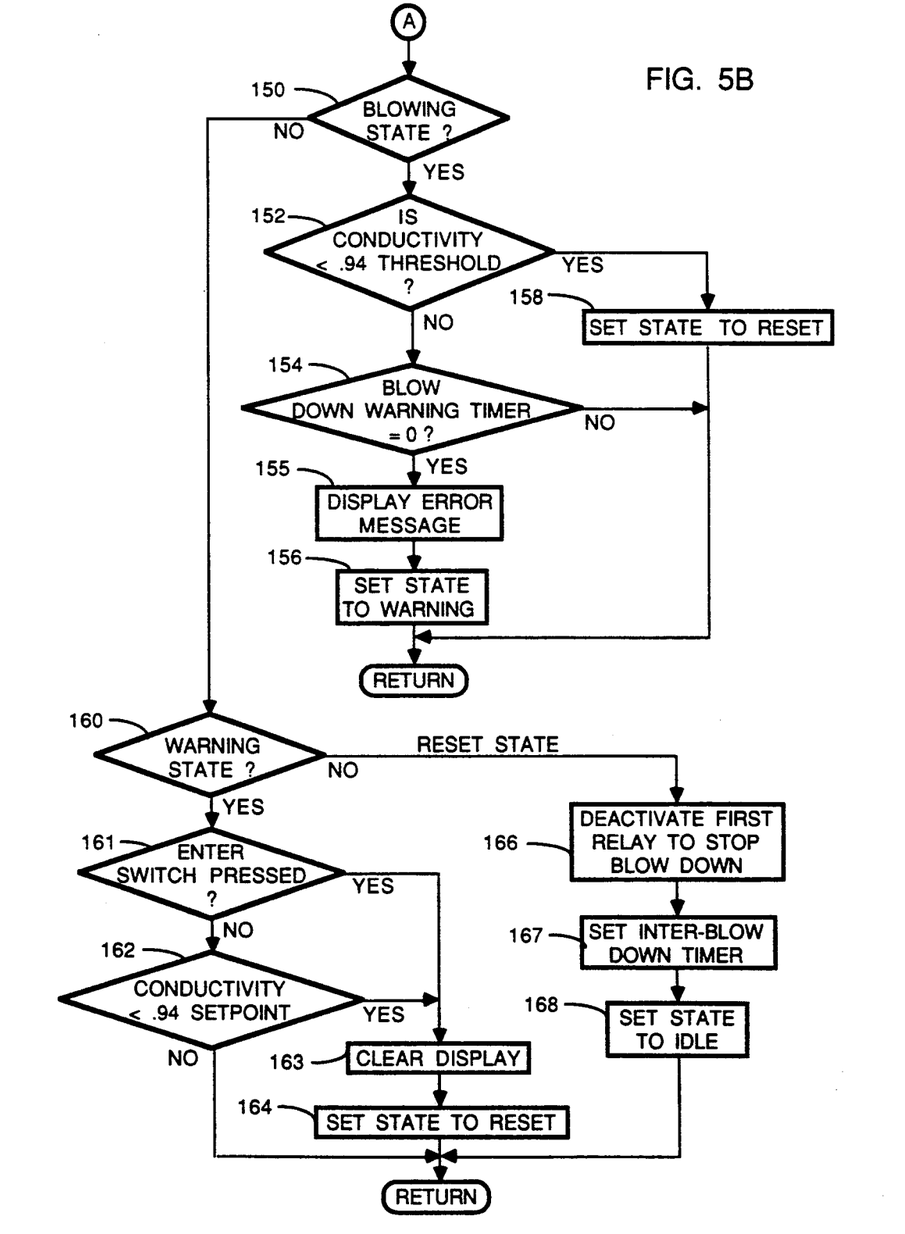

Then at step 108 the time stored in memory is checked to determine if the seconds register in memory has been incremented since the last time that this step was executed. If so, the program execution branches to step 109 where a subroutine depicted in the flowchart in FIGS. 5A-5B is called. This subroutine is executed once every second and commences at step 120 with the microcomputer 44 incrementing a counter which tabulates the one-second intervals. This count is used subsequently to determine when to call another subroutine that is executed every five seconds.

The program execution advances to step 121 at which signals from the conductivity and temperature sensors in device 35 are read by the microcomputer 44. The reading of both these parameters utilizes an auto-ranging technique in which the micro =computer 44 sends commands to the analog multiplexer 70 in FIG. 2 to sequentially select the different inputs of the multiplexer which are connected to the conductivity sensor amplifier 64. These multiplexer inputs are connected to different valued resistors in set 66 which attenuate the analog signal from the amplifier 64 by various amounts. This enables a wide range of analog signal levels to be interfaced to the analog input of the microcomputer 44. The microcomputer 44 sequentially selects each multiplexer input until the output from its internal analog to digital converter produces an output value having a satisfactory magnitude for signal resolution. Such auto-ranging techniques are well understood by persons skilled in signal measurement. The microcomputer 44 also knows the attenuation factor of the finally selected input, which enables the value from the sensor to be normalized during later computation of conductivity. A similar technique is used to read the analog signal from the temperature sensor applied other inputs of the multiplexer 70. The digitized values from the conductivity and temperature sensors are stored temporarily in a random access memory (RAM) within the microcomputer 44. At step 122, the value from the temperature sensor in device 35 is converted to temperature and then used to produce a compensated conductivity measurement.

The measured conductivity is compared at step 123 to the conductivity threshold defined by entry 89 of the configuration data table 87 (FIG. 3). If the newly measured conductivity is above the threshold, a high logic level is stored within the output latch of group 72 that is associated with the sixth opto-isolator 83 at step 124 to produce an output signal indicating that the conductivity threshold limit has been exceeded. Otherwise at step 125, a low logic level is stored in the output latch of group 72 which controls the sixth opto-isolator 83 to terminate any previous indication by its output signal that the conductivity threshold limit had been exceeded.

The next portion of the control program regulates the application of the three chemicals from tanks 31-33. These chemicals can be introduced into the cooling tower 10 either periodically using a timer or based on the amount of water that flows from the feed water tank 16 into the boiler 10. For the latter case, the flow meter 20 produces a pulsed signal on line 21 that has a frequency which is proportional to the flow rate of the water through the inlet 18. This flow meter signal is connected via buffer amplifier 60 to an internal counter of microcomputer 44 which counts pulses of the flow meter signal independent of other operations performed by the microcomputer. As will be described, every five seconds the microcomputer 44 reads the flow meter counter and processes the flow rate data to calculate the volume of water that has been added to the boiler 10. The calculated volume is added to the contents of separate incremental volume registers for each of the three chemicals. The contents of these registers indicate the volume of water that has been added to the boiler since the last application of the respective chemical. The time at which to add the chemical is determined based of the contents of these registers.

Figure 6:
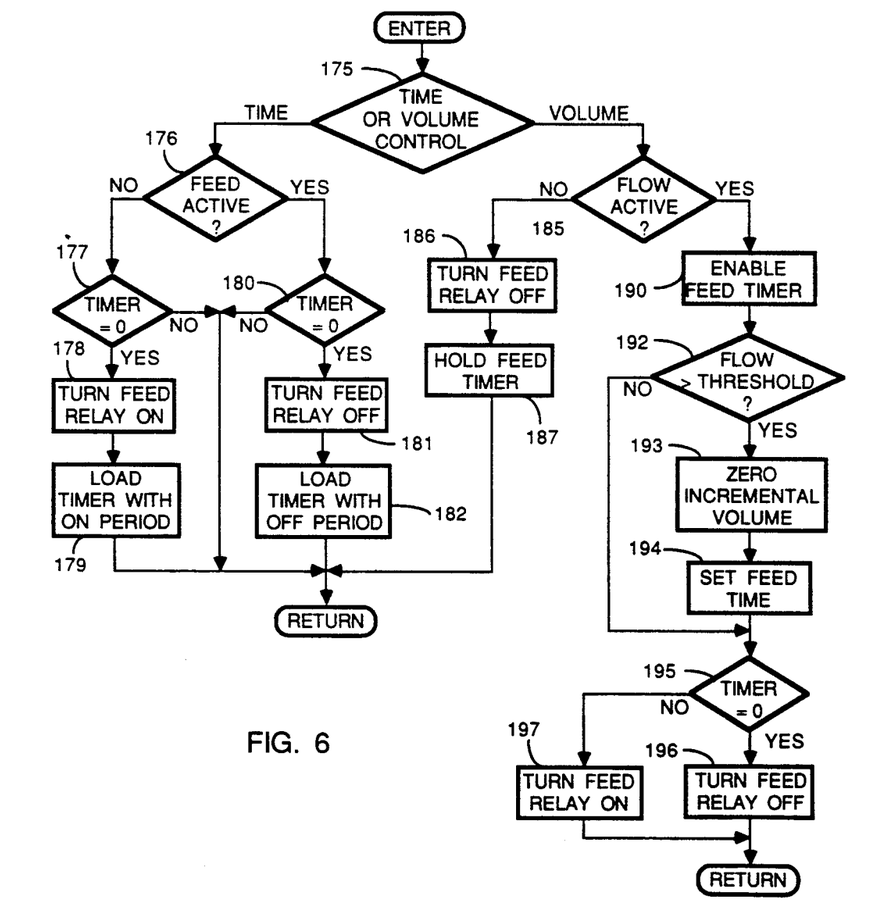
FIG. 6 is a flowchart of a subroutine that is called from the subroutine in FIG. 5A.

The chemical application is controlled by a subroutine that is called at step 126, 127 and 128 for each of the three chemicals. Although separate subroutines are used to control the application of each chemical, the steps of the subroutines are the same except for controlling different relays and timers associated with the specific chemical. A flowchart of the generic subroutine is shown in FIG. 6 and will be described with respect to the first chemical in tank 31. The chemical application subroutine commences at step 175 where the microcomputer 44 reads the contents of data table block 93 for the designated chemical. If the data from this location consists of zeroes, then the control is performed using a timer and the program execution branches to step 176.

Although the use of the timer is being described in terms of controlling a chemical pump, the time can be used to operate other types of electrical devices.

At this juncture, the microcomputer 44 determines whether the first chemical is already being fed into the boiler water. This is accomplished by checking a flag bit that is set whenever the feed is occurring. If the chemical feed is not active, the program execution branches to step 177 where a timer for the first chemical is tested to determine if it has timed out, i.e. has a zero value. When the timer reaches zero, it is time once again to apply the first chemical to the boiler water. This is accomplished at step 178 at which the second relay 76 which controls the application of the first chemical is energized by storing a high logic level in the corresponding output latch in group 72. Then at step 179, the feed timer for the first chemical is loaded with the value of the "on period" from block 95 of the data table 87. The timer then commences timing the length of the interval that the first chemical is being applied to the boiler water and the program execution returns to the one-second subroutine of FIG. 5A.

If at step 176 the determination is made that the first chemical already is being applied to the boiler water, the program execution branches to step 180 where the feed timer is tested to determine if the "on period" has expired as indicated when the timer reaches zero. This happens when the first chemical has been applied to the boiler water for the amount of time which is designated in block 95 of the data table 87. When the respective timer expires, the program execution advances to step 181 where the second relay 76 is turned off to discontinue the application of the first chemical. The relay is turned off by storing a low level logic bit in the corresponding output latch in group 72. Then at step 182, the microcomputer 44 loads the timer for the first chemical with the data contained in block 76 of memory table 87 which designates the period of time until the next application of the first chemical. However, if the feed timer does not have a zero value at steps 177 and 180, the execution of the chemical application subroutine returns to the next step (e.g. 127) of the one second subroutine which follows the step at which the chemical application subroutine was called.

If at step 175 of the chemical application subroutine in FIG. 6, non-zero data was read from the water volume entry 93 for the first chemical, the program execution branches to step 185 and a section of the subroutine which controls chemical application based on water flow volume into the boiler 10. A determination is made whether water is in fact flowing from the feed water tank 16, as indicated by a pulse signal being received on line 21 from the flow meter 20. If water is not flowing through the inlet 18 of the boiler, any application of chemicals which is occurring must be terminated to avoid high concentrations of the chemicals building up within the pipe leading to the inlet. Thus, if the flow is not active, the program execution branches to step 186 where the second relay 76 controlling the feed of the first chemical is turned off. Then at step 187, the operation of the timer for the first chemical is inhibited with the timer retaining its current time value so that the chemical application can resume when the water flows again. The execution of the chemical application subroutine then returns to the step of FIG. 5A from which the subroutine was called.

If, however, when the flow based control is active and water is flowing from the feed water tank 16 to the boiler 10 as determined at step 185, the program execution branches to step 190 where the feed timer is enabled. If the operation of the timer had been suspended previously, this action resumes the operation of the timer at the point where it was halted. If the timer has a zero value, enabling the timer at step 190 does not alter that value.

The execution of the chemical application subroutine in FIG. 6 advances to step 192 where a determination is made whether the contents of the incremental volume register for the first chemical exceeds the water volume threshold defined in entry 93 of the configuration data table 87 (FIG. 3). If the incremental flow volume is below the threshold, the chemical application subroutine jumps to step 195. When the contents of the incremental flow volume register exceed the stored water volume threshold, the program branches to step 193. There the microcomputer 44 sets the incremental flow volume register to zero. Then the timer within microcomputer 44 is loaded with the chemical feed time stored in entry 94 of the data table 87 to initialize that timer at step 194.

The timer for the first chemical then is tested at step 195 to determine whether its value has reached zero. If that is the case, the second relay 76 which controls the feed of the first chemical is turned off at step 196 before the subroutine returns to the step of the one-second subroutine in FIG. 5A from which the application subroutine is called. If the feed timer has not expired at step 195, the second relay 76 is turned on to close its contacts and energize the first chemical pump 25 to begin the application of the chemical at step 197 before the subroutine ends.

Once the chemical application subroutine has been executed for each of the three chemicals, the one-second subroutine in FIG. 5A enters a section at step 129 which implements a state machine type control of the boiler blow down. The state machine control has five states: an idle state, a sample state, a blowing state a warning state and a reset state which are defined by the remaining sections of the one-second subroutine. The state of the control is indicated by a semaphore stored within the random access memory of the microcomputer 44.

The state machine control section commences at step 129 where the semaphore is inspected to determine whether the control is in the idle state. If so, the program execution advances to step 130 where a determination is made whether it is time to blow down the boiler in order to take a conductivity sample. The conductivity is sampled periodically as determined by the inter-blow down interval stored within entry 90 of configuration data table 87. As will be described at the completion of a blow down, this interval is loaded into a timer to provide an indication when another conductivity sample is to be acquired. The interblow down interval timer is tested at step 131. If it has expired, a timer for a delay until the first sampling time is started by loading the timer with the sampling duration specified by data table entry 91. At step 132, the first relay 74 is activated to open the drain valve 38 releasing water from the boiler 10. The microcomputer 44 then changes the semaphore to place the control in the sample state at step 133. The one-second subroutine terminates returning to step 110 on FIG. 4.

Referring still to FIG. 5A, the next time the one-second subroutine is called, the execution branches from step 129 to step 134 as the control is now in the sample state. Therefore, step 134 will be executed by the microcomputer 44 testing the sampling delay timer to determine if it has reached zero. The conductivity measurement is delayed to allow water from within the boiler to flow through outlet 34 and enter sensor 35. During the delay period, the one-second subroutine terminates at step 130 and the execution returns to the main control program.

At the end of the delay period the program advances to step 138 where the conductivity calculated at step 122 is compared to the conductivity threshold defined by entry 89 of the configuration data table 87 (FIG. 3). If the conductivity is below the threshold, the program execution branches to step 140 where the state of the controller is changed to the reset state by altering the semaphore in the microcomputer memory. Then the second subroutine returns to the main control program.

If, however, the measured conductivity is found to exceed the threshold limit at step 138, the blow down should continue in order to reduce the total dissolved solids in the boiler water. In this situation, the program execution branches to step 144 where a blow down warning timer started by loading it with the warning time from entry 92 in the configuration data table 87. Then the microcomputer 44 alters the semaphore to indicate that the control is now in the blowing, or blow down, state at step 146. The execution of the one-second subroutine returns to step 110 of the main control program in FIG. 4.

When the control is in the blowing state, the program execution passes through steps 120-129 and 134 to step 150 on FIG. 5B where the semaphore is tested to determine the state of the system controller 40. As it is in the blowing state, the program execution advances to step 152 where the microcomputer 44 determines whether the most recent conductivity measurement is less than 94 percent of the threshold from data table entry 89. If that is the case, the blow down should be terminated. This is indicated by the semaphore being altered to place the controller in the reset state at step 15 before returning to step 110 of the main control program.

When the conductivity tested at step 152 is greater than 94 percent of the conductivity threshold, the program execution branches to step 154 where the blow down warning timer that was activated at step 144 is tested to determine if it has expired. If the timer is still active, the one-second subroutine returns expires before the conductivity has dropped below 94 percent of the threshold, the microcomputer 44 sends an error message to the display 56 at step 155. The duration of the warning time stored in data table entry 92 is chosen by the operator so that the conductivity should drop to a satisfactory level within that time. Failure to do so indicates that the conductivity sensor may be fouled and require cleaning. Then the semaphore is changed to place the controller in the warning state at step 156 before returning to step 110 of the main control program of FIG. 4.

Referring still to the one-second subroutine flowchart of FIG. 5B, when the device is in the warning state, the program execution advances through steps 120-129, 134 and 150 to step 160 and on to step 161. At this juncture, a test is made whether the operator is pressing the ENTER switch on key pad 54. The operator depresses the ENTER switch to force the controller out of the warning state. The warning state also is exited at step 162 when the measured conductivity drops below 94 percent of the conductivity threshold stored defined by entry 87 of the configuration data table. When an exit from the warning state is indicated, the program execution advances to step 163 where the display 56 is cleared of any warning message that was previously being displayed, the state semaphore is changed at step 164 to indicate the reset state. The program execution then returns to step 110 of the main program.

When the controller is in the reset state, the program execution branches from step 160 to step 166. At this step, the microcomputer 44 stores a low logic level in the output data latch 72 that is associated with the first relay 74 to close the drain valve 38 terminating the blow down. Then at step 167, the sampling timer is loaded with the sampling interval read from entry 91 of the configuration data table 87. Finally at step 168, the state semaphore is changed to indicate the idle state before the one-second subroutine terminates.

Referring once again to the main control program flowchart of FIG. 4, when the one-second subroutine terminates at any of the previously described points, the program execution returns from step 109 which called the subroutine to step 110. At this time, the one-second counter is tested to determine if five seconds have elapsed since the counter was reset. Whenever five seconds has elapsed, a five-second subroutine is called from step 111.

Figure 7:
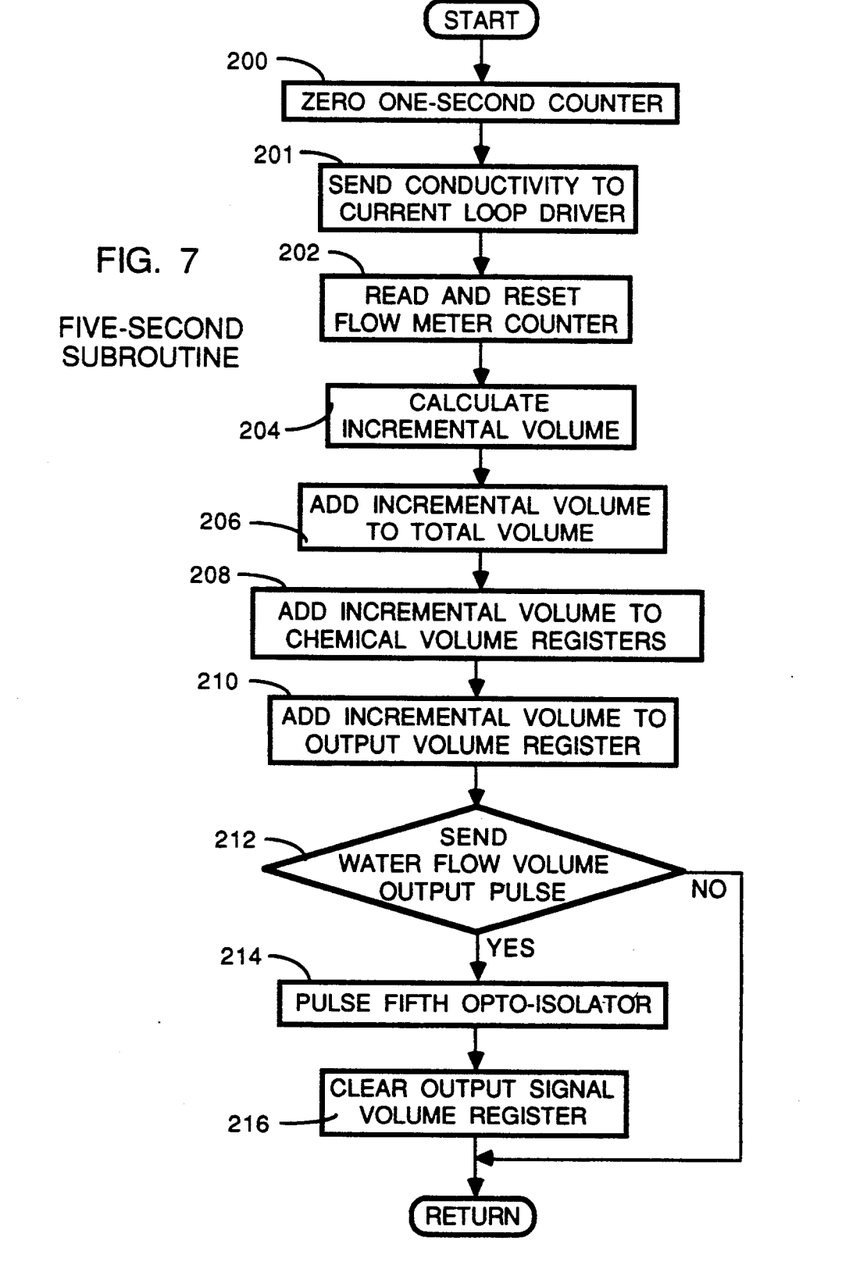
FIG. 7 is a flowchart of a subroutine that is called by the program in FIG. 4 at five-second intervals.

With reference to FIG. 7 the five-second subroutine commences execution at step 200 where the microcomputer 44 zeroes the one-second counter so that another five-second interval can be measured. Then at step 201 the microcomputer sends the most recent conductivity measurement to the driver 50 for the 4-20 milliampere current loop output.

The program execution advances to step 202 at which the microcomputer 44 reads the count from the internal counter circuit that receives the flow rate signal from meter 20 before resetting the count to zero. At step 204, the microcomputer uses this count, acquired during the five second flow sampling period, together with the information about the flow meter 20 stored in section 99 of data table 87 to calculate the incremental volume of water fed to the boiler 10 during the flow sampling period. The incremental water volume measurement is added at step 206 to a memory location which holds the total volume of water fed to the boiler 10 since installation of the system controller 40. Next the incremental water volume measurement is added to the contents of the volume register for each of the three chemicals in the microcomputer's internal memory. The sums are stored back into those registers at step 208. The contents of each of the three memory registers indicate the amount of water that has flowed into the boiler 10 since the last application of the corresponding chemical.

The incremental water volume measurement also is added to an output signal volume register at step 210. Then at step 212 this latter register is examined to determine if a water flow signal pulse should be sent by the fifth opto-isolator 82. This signal is pulsed every time a given amount of water has been fed to the boiler as indicated by entry 100 in the configuration data table 87. Thus, whether to pulse this signal is determined by comparing this data table entry with the contents of the output signal volume register. When appropriate a signal pulse is sent at step 214 by setting the data latch in group 72 which is coupled to the fifth optoisolator 82. The program execution delays at this step for the duration of the pulse and then resets the data latch. The output signal volume register then is cleared at step 216.

The execution of the five-second subroutine terminates returning to the main control program at step 112.

At that step in the program shown in FIG. 4, the microcomputer 44 inputs from the keypad 54 are tested to detect if a key is depressed by the operator. If so, a variable that indicates the type of data to be presented on display 56 is changed to the next type at step 114. In the run mode the keypad 54 is used only to change the type of data being displayed. For example, information regarding the relay states, time of day, water conductivity, total flow volume and sensor temperature alternatively can be displayed. The set-up switch 53 then is checked at step 116 to determine whether the system is to be placed in the set-up mode and if so, the program execution jumps to the set-up routine at step 118. The program execution then returns to step 102 to repeat the control loop.

We claim:

1. A water treatment controller for a boiler which includes a drain valve, a water inlet and a mechanism for adding a chemical to water used by the boiler, said water treatment controller comprising:

means for sensing the conductivity of boiler water;

valve control means for periodically opening the drain valve, and for closing the drain valve when the conductivity is less than a defined threshold level;

means for detecting the flow of water through the inlet;

means for operating the mechanism to add the chemical in response to an occurrence of a given event;

means for measuring of the amount of time that the chemical is being added to the water after the occurrence of the given event;

means for terminating the addition of the chemical when said means for measuring indicates that the chemical has been added for a predefined interval; and means for halting the addition of chemical when said means for detecting the flow of water indicates that water has ceased flowing through the inlet.

2. The water treatment controller as recited in claim 1 wherein said means for operating suspends adding the chemical when water ceases flowing through the inlet, and resumes when water again flows through the inlet.

3. The water treatment controller as recited in claim 2 wherein the operation of said means for measuring is suspended and a measurement of time is retained when water ceases flowing through the inlet, and the operation of said means for measuring resumes when water flows again through the inlet.

4. The water treatment controller as recited in claim 1 further comprising means, responsive to said valve control means, for measuring a length of time that the drain valve is opened; and means for producing a warning signal when the length of time exceeds a predetermined amount.

5. The water treatment controller as recited in claim 1 wherein:

said means for detecting the flow of water includes means for measuring the volume of water flowing through the inlet; and said means for operating the mechanism to add a chemical does so in response to an indication, from said means for detecting, that a predefined volume of water has flowed through the water inlet.

6. The water treatment controller as recited in claim 1 wherein said means for operating causes the mechanism to add the chemical to the water after a preset interval of time has elapsed from a previous addition of the chemical.

7. A water treatment controller for a boiler which includes a drain valve, a water inlet and a mechanism for adding a chemical to water used by the boiler, said water treatment controller comprising:

means for sensing the conductivity of water flowing from the boiler through the drain valve, such sensing commencing a preset interval of time after the drain valve is opened;

valve control means for periodically opening the drain valve, and for closing the drain valve when the conductivity is less than a user defined threshold level;

means for measuring of the amount of water flowing through the inlet;

means for operating the mechanism to add the chemical to water for a preset length of time either in response to a predefined amount of water flowing through the inlet since a previous application of the chemical, or at a predefined interval of time since a previous application of the chemical, as selected by a user; and means for halting the addition of the chemical whenever said means for measuring indicates that water has ceased flowing through the inlet.

8. The water treatment controller as recited in claim 7 wherein said means for operating the mechanism to add the chemical to water includes a timer for measuring an amount of time that the chemical is added to the water, in which the operation of said timer is suspended whenever said means for measuring indicates that water is not flowing through the inlet.

9. A controller, for an apparatus that adds a chemical to fluid flowing through a conduit, comprising:

means for sensing the flow of fluid through the conduit;

means for timing an amount of time that the chemical is being added to the fluid; and means for operating the apparatus by enabling addition of the chemical in response to an occurrence of a given event, disabling the addition of the chemical when said means for timing indicates that the chemical has been added for a user defined period, and suspending the addition of chemical when said means for sensing indicates that fluid has ceased flowing through the conduit.

10. The controller as recited in claim 9 wherein said means for operating the apparatus resumes the suspended addition of the chemical when fluid flows again through the conduit.

11. The controller as recited in claim 9 wherein the operation of said means for timing is suspended and a measurement of time is retained when fluid ceases flowing through the conduit, and the operation of said means for timing resumes with that measurement when fluid flows again through the conduit.

12. The controller as recited in claim 9 wherein:

said means for sensing the flow of fluid measures the volume of fluid flowing through the conduit; and said means for operating the apparatus enables addition of the chemical to the fluid in response to an indication from said means for sensing that a predefined volume of fluid has flowed through the conduit.

13. The controller as recited in claim 9 wherein said means for operating the apparatus enables addition of the chemical to the fluid when a preset interval of time has elapsed from a previous addition of the chemical.

14. A control system, for a boiler which includes a drain valve and a water inlet, comprising:

means for detecting the conductivity of water flowing from the boiler through the drain valve, such detecting commences a preset interval of time after the drain valve is opened;

valve control means for periodically opening the drain valve, and for closing the drain valve when the conductivity is less than a defined threshold level;

means for measuring of the amount of water flowing through the inlet;

an electric switch;

switch control means for closing said switch for a preset length of time either in a first mode when a predefined amount of water flows through the inlet or in a second mode at a predefined interval of time after a previous closure of said switch, the first or second mode being selected by a user of the control system, and said switch control means in the first mode opening said switch whenever said means for measuring indicates that water has ceased flowing through the inlet.

15. The control system as recited in claim 14 wherein when said switch is opened in response to a cessation of water flow through the inlet, said switch control means closes said switch for a remainder of the preset length of time when the water flows again through the inlet.

* * * * *